United States Patent
Kim

(10) Patent No.: US 10,104,725 B2
(45) Date of Patent: Oct. 16, 2018

(54) METHOD AND APPARATUS FOR MULTI CHANNEL CURRENT DRIVING

(71) Applicant: ABOV SEMICONDUCTOR CO., LTD., Cheongwon-Gun (KR)

(72) Inventor: Chang Min Kim, Gyeonggi-Do (KR)

(73) Assignee: ABOV SEMICONDUCTOR CO., LTD., Cheongwon-gun, Chungcheongbuk-do (KR)

( * ) Notice: Subject to any disclaimer, the term of this patent is extended or adjusted under 35 U.S.C. 154(b) by 374 days.

(21) Appl. No.: 14/815,628

(22) Filed: Jul. 31, 2015

(65) Prior Publication Data

US 2016/0036237 A1 Feb. 4, 2016

(30) Foreign Application Priority Data

Jul. 31, 2014 (KR) .................. 10-2014-0098041

(51) Int. Cl.
*H05B 33/08* (2006.01)
*G05F 1/46* (2006.01)

(52) U.S. Cl.
CPC ..... *H05B 33/0815* (2013.01); *H05B 33/0827* (2013.01); *Y02B 20/347* (2013.01)

(58) Field of Classification Search
CPC .... G05F 1/461; Y02B 20/347; H02M 1/4225; G01R 19/16576
See application file for complete search history.

(56) References Cited

U.S. PATENT DOCUMENTS

| 4,326,715 | A | 4/1982 | Ito et al. |
| 6,501,234 | B2 | 12/2002 | Lin et al. |
| 6,707,264 | B2 | 3/2004 | Lin et al. |
| 8,248,051 | B2 | 8/2012 | Colbeck et al. |
| 8,552,710 | B2 | 10/2013 | Lee |
| 9,237,624 | B2 | 1/2016 | Logiudice |
| 2007/0195552 | A1 | 8/2007 | Park |
| 2009/0174338 | A1* | 7/2009 | Muramatsu ........ H05B 33/0818 315/250 |
| 2011/0109233 | A1 | 5/2011 | Wang |

(Continued)

FOREIGN PATENT DOCUMENTS

| CN | 1223239 C | 10/2005 |
| CN | 103024987 B | 4/2015 |

(Continued)

*Primary Examiner* — Hal Kaplan
(74) *Attorney, Agent, or Firm* — Mintz Levin Cohn Ferris Glovsky and Popeo, P.C.; Kongsik Kim; Jhongwoo Jay Peck

(57) ABSTRACT

A multi-channel current control circuit and method are disclosed herein. The multi-channel current control includes an operational amplifier provided for a channel; a low pass filter provided for the channel connected to an input terminal of the operational amplifier; a mode control circuit configured to control the low pass filter to have one of predetermined time constants in accordance with predetermined current control mode; and a pulse width modulation circuit configured to generate a pulse width modulation signal provided for the channel; and transfer the pulse width modulation signal to the input terminal of the operational amplifier via the low pass filter. The operational amplifier controls a load current of the channel using an output voltage of the operational amplifier.

10 Claims, 7 Drawing Sheets

(56) References Cited

U.S. PATENT DOCUMENTS

2013/0114016 A1* 5/2013 Lim .................. H05B 33/0827
349/43
2014/0001978 A1 1/2014 Lee

FOREIGN PATENT DOCUMENTS

| | | |
|---|---|---|
| JP | 07-170799 A | 7/1995 |
| KR | 20000071907 A | 12/2000 |
| KR | 20060029514 A | 4/2006 |
| KR | 10-2010-0065881 A | 6/2010 |
| KR | 1020110052409 A | 5/2011 |
| KR | 10-2012-0064084 A | 6/2012 |
| KR | 10-2013-0050509 A | 5/2013 |
| KR | 10-1341021 B1 | 12/2013 |

* cited by examiner

METHOD AND APPARATUS FOR MULTI CHANNEL CURRENT DRIVING

CROSS-REFERENCE TO RELATED APPLICATION

This application claims under 35 U.S.C. § 119(a) the benefit of Korean Application No. 10-2014-0098041 filed on Jul. 31, 2014, which application is incorporated herein by reference.

TECHNICAL FIELD

The present invention relates to technology regarding a multi-channel current regulation and/or driving method and, more particularly, to a pulse width modulation (PWM) multi-channel current regulation and/or driving method which are capable of selecting PWM scheme depending on the application.

BACKGROUND ART

Circuits using a PWM method are widely used as circuits for driving regulated current or voltage in output stages. A PWM method is widely used in DC-DC converters. A PWM method is also used for various purposes, such as those of a buck/booster converter and a current regulator circuit, based on circuit topology.

In a PWM circuit, the ratio of the amount of charges transferred to an output stage and the amount of charges discharged from the output stage is controlled in response to the duty cycle of a control signal pulse. The voltage of the output stage reaches a regulated DC value depending on the balance between the amount of charges transferred to the capacitance of the output stage and accumulated thereon and the amount of charges discharged from the capacitance of the output stage. To control a duty cycle of PWM circuit, a closed looped control scheme based on feedback of the state value of an output stage is widely used. An open looped control scheme using an external signal, not feedback, may be used in special applications.

In general, in a regulated current driving circuit, a load, a driving transistor, and a resistor are connected in series, and undergo the process of converting DC voltage into DC current.

A multi-channel regulated current driving apparatus is widely used when the currents of light-emitting diodes (LEDs) are driven. LEDs need to be driven at constant current in order to keep the brightness thereof constant because the amount of light emitted by an LED is determined by a current value. To use LEDs as light sources, a plurality of LEDs is connected via multiple channels. Each of the LED channels includes a plurality of LEDs connected in series, and the plurality of LED channels is connected in parallel, thereby forming a multi-channel LED array.

In this case, the multi-channel regulated current driving apparatus controls the LED channels to flow the same current via the LED channels regardless of their loads. The general technical object of multi-channel regulated current driving apparatuses is to provide a control circuit having a small area and also effectively reduce the differences in regulated current levels between multi-channel loads. The differences in regulated current levels results from mainly due to the differences between the characteristics of loads, such as LEDs.

High currents flow into LEDs with forward bias voltage Vf for emitting light. Different current levels may flow into the LEDs due to the differences in characteristic between the LEDs even with respect to the same bias voltage. In a multi-channel regulated current driving apparatus, a plurality of LED channels can be driven in the state in which a single DC-DC converter circuit is connected to the plurality of LED channels in common in order to reduce the area of a control circuit. In this case, the output of the DC-DC converter is determined based on the LED array of an LED channel having a high forward bias voltage.

In a conventional multi-channel LED constant current control apparatus, excessive voltage may be applied to both ends of each transistor for regulated current driving due to the difference in forward bias voltage between LED channels. In this case, the transistor through which high current flows has high power consumption, and generates a large amount of heat. In order for the transistor to normally operate regardless of high power consumption and a large amount of heat, the size of the transistor should increase because the transistor requires a high-capacity channel (or a high channel ratio) in order to withstand the high power consumption. As a result, the transistors of the conventional multi-channel LED constant current control apparatus are not integrated into an integrated circuit (IC) due to their increased sizes, but are disposed outside an IC.

In order to mitigate the above problem, Korean Patent Application Publication No. 10-2013-0050509 entitled "Apparatus for Current Regulation of Multi-Channel LEDs and Liquid Crystal Display Using Same" discloses a technology for effectively controlling electric current.

The prior art of current regulator for multi-channel LEDs includes: a plurality of LED channels each including an LED array, a transistor and a variable emitter resistor; a feedback sensing circuit configured to sense the collector voltage of the transistor in each of the LED channels; and a control circuit configured to increase the variable emitter resistance of an LED channel, in which the collector voltage of the transistor is higher than those of other LED channels, in response to a feedback sensing result received from the feedback sensing circuit.

In the prior art, there has been introduced a means for monitoring electric current flowing into a driving transistor for each channel and then reducing the difference in regulated current levels between channels by increasing voltage applied to a variable resistor when excessive current flows into the channel. In particular, each channel can be limited such that excessive current does not flow into the driving transistor of the channel.

In the prior art, the rated currents of transistors can be lowered, the sizes of the transistors can be reduced, and the power of the transistors unnecessarily consumed in LED channels having low forward bias voltage can be reduced. Accordingly, the transistors can be integrated into an IC. Moreover, the prior art can reduce total system and circuit costs because the area of the printed circuit board (PCB) of a multi-channel LED device is reduced by integrating driving transistors into an IC.

However, the prior art has limited applications because it can be applied to only the cases where the driving current values of driving transistors can be predicted. Furthermore, in the prior art, the difference in current levels between driving transistors is removed by controlling the values of the variable resistor. If the difference in current levels between the driving transistors is very large, the variable resistor should have a very wide control range in order to deal with the large difference. Accordingly, a problem arises in that a circuit area required to implement such a variable resistor increases. Furthermore, another problem arises in that it is difficult to precisely control the currents of the driving transistors because the resolution of the current levels of the driving transistors can be determined by resolution of the variable resistor.

Therefore, there is a need for the development of a multi-channel current driving scheme having a smaller circuit area and various application fields and for the development of a multi-channel current driving apparatus capable of high-resolution control even in a small circuit area.

SUMMARY OF THE DISCLOSURE

Accordingly, the present invention has been made to solve the above problems occurring in the conventional technology, and an object of the present invention is to provide a multi-channel current driving method and apparatus, which provide various application fields using a small area and enable high-resolution control.

As described above, a problem arises in that the difference in voltage applied between the drain and source of a driving transistor increases and thus the amount of heat generated by the driving transistor increases when a voltage applied to a load is low (i.e., when a forward bias voltage Vf is low in the case where the load is an LED) because the load of each channel has different characteristics.

Another object of the present invention is to provide a multi-channel regulated current driving apparatus, which is capable of controlling the driving currents of channels to become a regulated value even when the differences in characteristics between the channels are large and a method capable of reducing the differences in driving current between the channels at high resolution.

Still another object of the present invention is to provide a circuit which enables the application of both a digital control scheme and an analog control scheme using a single circuit in a multi-channel current control apparatus. The analog control scheme means a conventional PWM control scheme, and the digital control scheme is a control scheme that has recently been widely used in multi-channel current control apparatuses.

Further still another object of the present invention is to provide an apparatus which is capable of setting a time constant corresponding to each of digital control mode and analog control mode using a low band pass filter (LPF) included in a PWM control unit and applying digital control mode or analog control mode using a single circuit based on the set time constant.

Further, another object of the present invention is to provide a multi-channel current driving method and apparatus, which employ an LPF (low pass filter) and an offset application circuit for each channel, and operate depending on the time constant of the LPF in such a way as to, in the case of digital control, allow current to be different for each channel using an offset generation circuit and then control the current level to be constant by feeding back the different current based on a PWM duty, and, in the case of analog control, control the current level using the combination of a voltage, smoothed using high-frequency PWM and the LPF, and the voltage of the offset generation circuit.

In accordance with an aspect of the present invention, there is provided a multi-channel current control method including: controlling a low pass filter provided for a channel to have one of predetermined time constants in accordance with predetermined current control mode, wherein the low pass filter is connected to an input terminal of an operational amplifier provided for the channel; transferring a pulse width modulation signal provided for the channel to the input terminal of the operational amplifier via the low pass filter; and controlling a channel load current using an output voltage of the operational amplifier.

The multi-channel current control method may further include controlling the frequency of the pulse width modulation signal in accordance with the current control mode.

The controlling the channel load current may include: adding an offset voltage to the output signal of the LPF; and controlling the driving current of the channel using the output signal of the LPF to which the offset voltage has been added.

The controlling the driving current of the channel may include controlling the driving current of the channel using the duty cycle of the PWM signal and the offset voltage. The controlling the driving current of the channel may include, if the channel comprises a plurality of channels and the current control mode is digital control mode, controlling driving currents of the plurality of channels to be same current value one another by controlling the duty cycles of PWM signals and offset voltages for the respective channels.

The controlling the driving current of the channel may include, if the current control mode is analog control mode, controlling the driving current of the channel by controlling the smoothed output voltage of the LPF and the offset voltage.

In accordance with another aspect of the present invention, there is provided a multi-channel current control circuit, including: an operational amplifier provided for a channel; a low pass filter provided for the channel connected to an input terminal of the operational amplifier; a mode control circuit configured to control the low pass filter to have one of predetermined time constants in accordance with predetermined current control mode; and a pulse width modulation circuit configured to: generate a pulse width modulation signal provided for the channel; and transfer the pulse width modulation signal to the input terminal of the operational amplifier via the low pass filter; wherein the operational amplifier controls a load current of the channel using an output voltage of the operational amplifier.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Embodiments of the present invention will be described in detail with reference to the accompanying drawings. In the following description of the present invention, if it is determined that detailed descriptions of related well-known configurations or functions may make the gist of the present invention obvious, the detailed descriptions will be omitted.

However, the present invention is not restricted or limited to the embodiments. The same reference symbols presented throughout the drawings denote the same elements.

Figure 1:
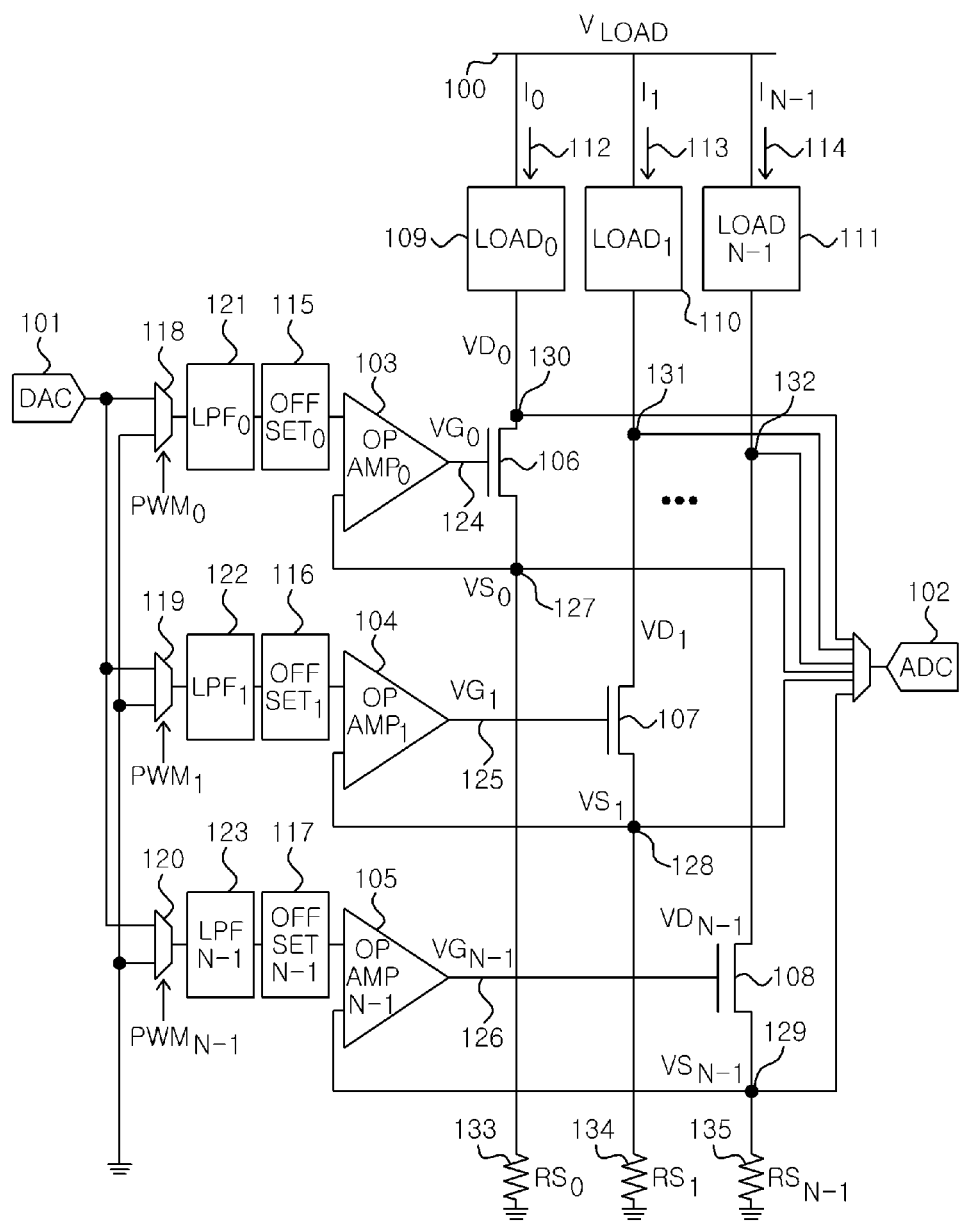
FIG. 1 is a circuit diagram illustrating a multi-channel current control apparatus according to an embodiment of the present invention.

FIG. 1 is a circuit diagram illustrating a multi-channel current control apparatus according to an embodiment of the present invention.

Referring to FIG. 1, the multi-channel current control apparatus includes a power supply 100, a digital to analog converter (DAC) 101 configured to generate a reference voltage used for target current value control, and an analog to digital converter (ADC) 102 configured to provide feedback used for target current and voltage control. The multi-channel current control apparatus of FIG. 1 further includes circuit elements dedicated for channel 0 to (N−1). The multi-channel current control apparatus of FIG. 1 further includes operational amplifiers (OP AMPs) 103 to 105 configured to provide regulated current for each of channel 1 to (N−1). The OP AMPS 103 to 105 drive gate node 124 to 126 of current driving transistors 106 to 108. The current driving transistors 106 to 108 drive current driving loads 109 to 111. The channel load currents 112 to 114 flow through the loads 109 to 111. The multi-channel current control apparatus of FIG. 1 further includes the offset generation circuits 115 to 117, PWM multiplexers (MUXs) 118 to 120, and Low pass filters (LPFs) 121 to 123. The PWM MUX 118 to 120 generates PWM signals based on the primitive PWM signal PWMn (n=0 to N−1).

According to FIG. 1, N channels are illustrated. For example, the channel 0 is implemented by OP AMP 103, current driving transistor 106, LOAD 109, PWM MUX 118, LPF 121, OFFSET circuit 115, sensing resistor 133, that is, circuit elements are dedicated for the channel 0.

Furthermore, as illustrated in FIG. 1, voltage level $VG_0$ of gate node 124 of driving transistor 106, voltage level $VD_0$ of drain node 130 of driving transistor 106, and voltage level $VS_0$ of source node 127 of driving transistor 106 are denoted for illustration of operation of channel 0.

The channel 1 is implemented by OP AMP 104, current driving transistor 107, LOAD 110, PWM MUX 119, LPF 122, OFFSET circuit 116, sensing resistor 134, that is, circuit elements are dedicated for the channel 1.

Voltage level $VG_1$ of gate node 125 of driving transistor 107, voltage level $VD_1$ of drain node 131 of driving transistor 107, and voltage level VS' of source node 128 of driving transistor 107 are denoted for illustration of operation of channel 1.

The channel N−1 is implemented by OP AMP 105, current driving transistor 108, LOAD 111, PWM MUX 120, LPF 123, OFFSET circuit 117, sensing resistor 135, that is, circuit elements are dedicated for the channel N−1.

Voltage level $VG_{N-1}$ of gate node 126 of driving transistor 108, voltage level $VD_{N-1}$ of drain node 132 of driving transistor 108, and voltage level $VS_{N-1}$ of source node 129 of driving transistor 108 are denoted for illustration of operation of channel N−1.

The current control circuit illustrated in FIG. 1 controls the current level $I_0$ to $I_{N-1}$ of channel load current 112 to 114 has the same current level one another.

The DAC 101 generates a reference voltage that determines a maximum driving current. The maximum current of each channel is determined to be a value obtained by dividing the voltage of the DAC 101 by the resistance $RS_0$ to $RS_{N-1}$ of each of the sensing resistors 133 to 135. For each channel, the drain voltage $VD_n$(n=0 to N−1) is determined by subtraction of voltage drop across the $load_n$(n=0 to N−1) from the voltage level $V_{LOAD}$ of the power supply 100. The voltage drop across the $load_n$ is denoted by a multiplication of current level $I_n$(n=0 to N−1) with the impedance of each of the $load_n$.

The drain voltage VDn may have the difference based on the difference in voltage drop across the loadn dedicated for each of the corresponding channel. As the drain voltage VDn becomes higher, the voltage applied across drain and source (VDn−VSn) of a driving transistor increases and results in the heat dissipation in the transistor. Since the heat dissipation by the transistor is directly related to reliability, the voltage applied to the drain-source of driving transistor should be controlled to be minimized.

The present embodiment proposes the current control circuit capable of being applied to both of digital control and analog control, and includes the channel-dedicated LPFs 121 to 123 and the channel-dedicated offset generation circuits 115 to 117. The channel-dedicated LPFs 121 to 123 need to be designed to have various time constants for being applied to both of digital control and analog control. The channel-dedicated LPFs 121 to 123 are used to control the slew rate of the OP AMPs in digital control, or are used to smooth a PWM signal in analog control.

The offset circuits 115 to 117 are capable of channel-dedicated current control because they are configured to control corresponding voltage values in both +/− directions. In this case, chip size may be minimized if offset voltage is designed to output a scaled part of the supply voltage $V_{LOAD}$. In the current control apparatus proposed by the present embodiment, a channel load current $I_0$ to $I_{N-1}$ is determined based on the combination of a primitive PWM signal PWMn (n=0 to N−1) and an offset circuit. In the digital control method, a primitive PWM signal PWMn operated in frequency equal to or lower than 1 KHz is generated, and the value of each channel load current is determined by PWM duty*(a DAC reference voltage+an offset value). In this case, the offset value may minimize each of the channel drain voltages $VD_0$ to $VD_{N-1}$ according to a change in voltage drop across each of the channel-dedicated driving loads 109 to 111 by controlling a current value for each channel.

Figure 5:
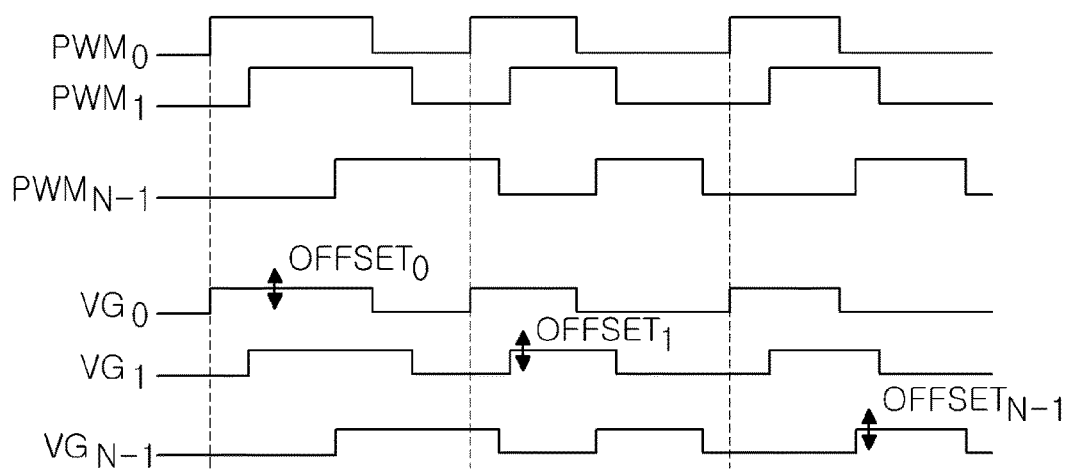
FIG. 5 is a diagram illustrating the operation of each node in digital control mode according to an embodiment of the present invention.

FIG. 5 is a diagram illustrating the operation of each node in digital control mode according to an embodiment of the present invention.

In digital control mode, each of the channel-dedicated current driving transistors 106 to 108 is turned on/off by each of primitive PWM signals $PWM_0$ to $PWM_{N-1}$. The primitive PWM signals go through LPF, OFFSET circuit, and OP AMP, and then it results in the channel gate voltage $VG_0$ to $VG_{N-1}$. In this case, a start time at which a primitive PWM signal PWMn start to rise is slightly shifted for each of channel. The phase difference is determined by one period of PWM ON/OFF divided by N. That is, in digital control mode, the channel-dedicated current driving transistors 106 to 108 are sequentially turned on/off with slight time differences, and the total load current may maintain almost a constant value when the load currents $I_0$ to of all the N channels are summed.

The LPFs are designed to have various time constants. As illustrated in FIG. 5, if the time constant is set to a value lower than that in analog control mode, digital control can be performed. That is, in digital control mode, the gate voltages $VG_0$ to $VG_{N-1}$ of gate nodes 124 to 126 of the driving transistors 106 to 108 have shapes of pulse wave. Accordingly, it is necessary to maintain the shape of pulse wave by setting the time constant to a low value. In digital control mode, the time constant is set to a lower value than that of the analog control mode, and the frequency of the PWM signal is also set to be low.

Figure 6:
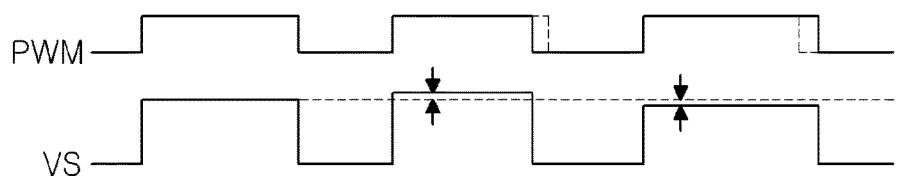
FIG. 6 is a diagram illustrating an output value for the compensation for the difference between channels in an offset control step in digital control mode according to an embodiment of the present invention.

FIG. 6 is a diagram illustrating an output value for the compensation for the difference between channels in an offset control step in digital control mode according to an embodiment of the present invention.

In the multi-channel current driving apparatus according to an embodiment of the present invention, as illustrated in FIG. 6, the difference between the channels can be reduced by correcting a PWM duty by the combination of the PWM signal of the current control apparatus and the offset circuit.

In the multi-channel current driving apparatus according to an embodiment of the present invention, the channel driving currents are primarily corrected by the duty cycle of the PWM signal, but the difference between the channel driving currents can be reduced more precisely by the addition of an offset voltage.

Figure 7:
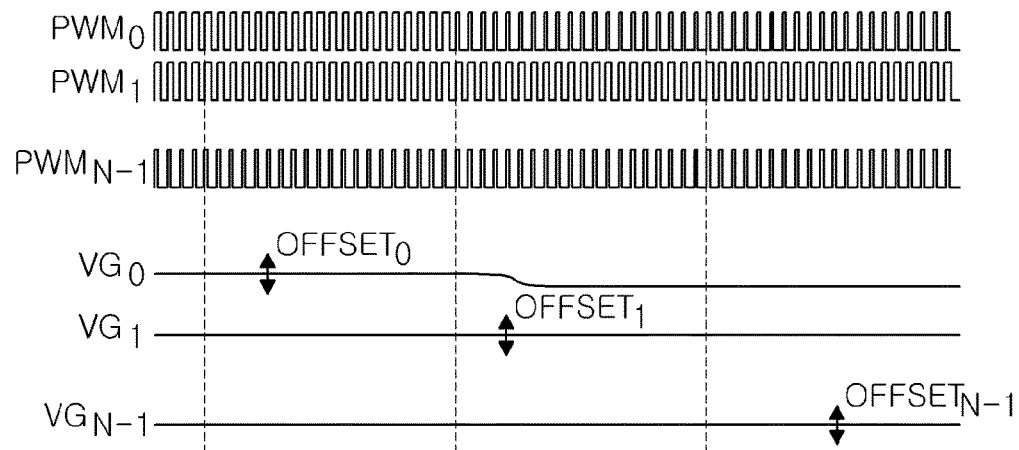
FIG. 7 is a diagram illustrating the operation of each node in analog control mode according to an embodiment of the present invention.

FIG. 7 is a diagram illustrating the operation of each node in analog control mode according to an embodiment of the present invention.

As illustrated in FIG. 7, in the analog control method, a PWM frequency equal to or higher than 1 MHz is generated, and the reference voltage of each channel is determined by the LPF. The channel current is determined by the voltages of the channel-dedicated LPFs 121 to 123 added to the voltages of the channel-dedicated offset generation circuits 115 to 117.

A PWM signal generator may be configured to have a small area, and may generate a reference voltage via a smoothing process. Accordingly, for this invention, a high-resolution voltage generator is not required for each channel in order to perform analog control, and high-resolution current control can be performed using only an offset generation device supporting a small voltage range.

In general, a simple offset generator has limitation in eliminating errors, so some errors are not cured but remained. In this invention, such remained errors may be corrected and mitigated by a feedback configuration for measuring the signals of the channel drain voltages $VD_0$ to $VD_{N-1}$ and the signals of the channel source voltages $VS_0$ to $VS_{N-1}$ via the ADC 102 for performing target current and voltage control. By the feedback and voltage control scheme, desired voltages of all interested nodes and desired currents of all interested branches may be fulfilled.

In fact, if the simple offset generator may function as a coarse error corrector, then the feedback loop including ADC may function as a fine error corrector. Therefore only relatively low resolution of the simple offset generator will do enough roles in the combination with the feedback loop including ADC. In this way, the multi-channel current control circuit of this invention regulates the channel load currents with high-resolution and small chip size.

In PWM mode using a conventional analog control method, LPFs may not necessarily be required. However, in an embodiment of the present invention, channel-dedicated current regulation is easily performed using different time constants applied to LPFs in digital control mode and analog control mode. In analog control mode, load currents may be controlled to have same value one another by applying a large time constant to the LPFs and thus smoothing the gate voltages $VG_0$ to $VG_{N-1}$ of the driving transistors 106 to 108.

Furthermore, the ADC 102 sequentially samples the channel current values or channel drain voltages $VD_0$ to $VD_{N-1}$, and receives the sampled values as PWM control references. Although not illustrated, the duty cycles of the channel-dedicated PWM signals and the offset values may be controlled by feeding back the channel drain voltages $VD_0$ to $VD_{N-1}$ sequentially obtained by the ADC 102.

Figure 2:
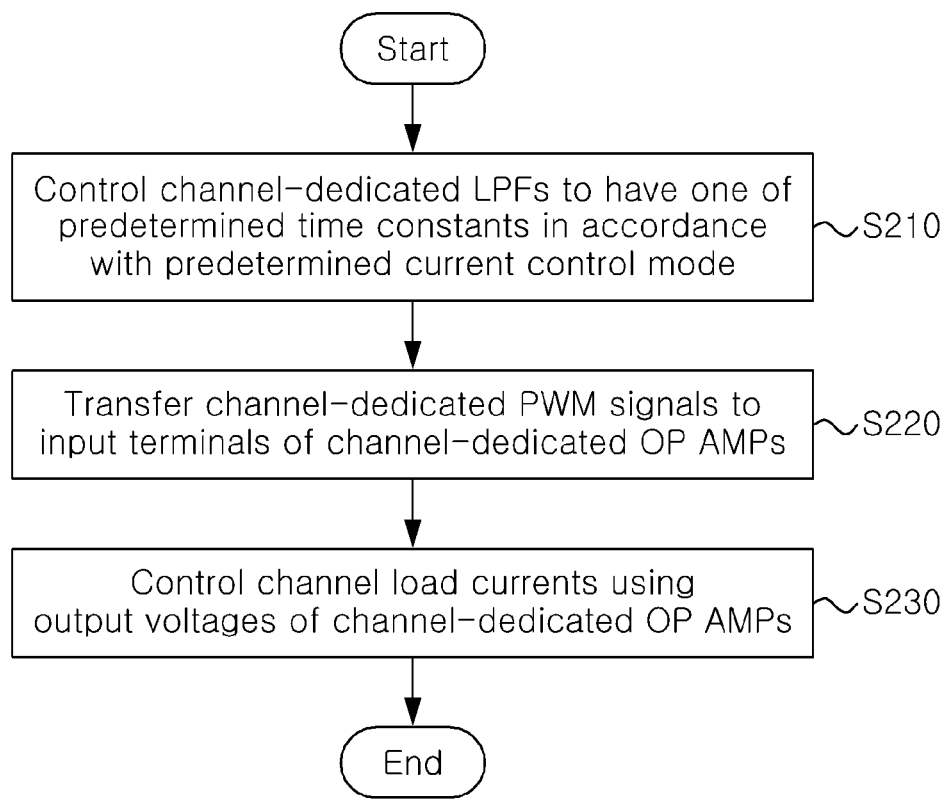
FIG. 2 is an operation flowchart illustrating a multi-channel current control method according to an embodiment of the present invention.

FIG. 2 is an operation flowchart illustrating a multi-channel current control method according to an embodiment of the present invention.

In the multi-channel current control method, the channel load currents are controlled by the PWM signals generated by the PWM MUXs 118 to 120. The PWM signals are applied to the respective channels pass through the channel-dedicated OP AMPs 103 to 105. The channel-dedicated LPFs 121 to 123, connected to the input terminal of the channel-dedicated OP AMPs 103 to 105, are controlled to have one of predetermined time constants so that the time constants correspond to predetermined current control mode at step S210. The predetermined current control mode may be one of digital PWM mode and analog PWM mode. The time constants are set to be corresponding to digital PWM mode and analog PWM mode. Digital PWM mode and analog PWM mode may be selectively applied using a single circuit based on each selected time constant.

The channel-dedicated PWM signals are transferred to the input terminal of the channel-dedicated OP AMPs 103 to 105 via the channel-dedicated LPFs 121 to 123 at step S220.

The channel-dedicated load currents 112 to 114 are controlled using the output voltages of the channel-dedicated OP AMPs 103 to 105 at step S230.

Analog control method is one of conventional PWM control method. In the analog control method, the gate voltage of a driving transistor is maintained at an almost constant value depending on the ratio of the amount of charges transferred into the parasitic capacitance of the gate terminal of the driving transistor and the amount of charges discharged from the parasitic capacitance in response to a high-frequency PWM signal.

When the analog control method is used in a multi-channel current control apparatus, a wide area is required for chip design because all the analog voltage range of a corresponding channel is needed to be output.

For this reason, in a multi-channel current control apparatus, particularly a multi-channel current control apparatus for LEDs, the digital control method using driving based the time differences between a plurality of channels is widely used. In the digital control method, each driving transistor is turned on or turned off in response to a PWM signal, and no current flows into the LED load of a corresponding channel when the driving transistor is turned off. In this case, since the LEDs of the respective channels are sequentially driven with time differences, they have an almost constant value when the load currents of all the channels are summed. The digital control method is widely used in a multi-channel current control method. In particular, the digital control method is applied to a case having a time resolution corresponding to a human's visual response speed, such as the case of LED lighting. The reason why the digital control method is widely used in the multi-channel current control of LED lighting is that the digital control method can reduce a circuit area compared to the analog control method because a PWM signal may be generated in the form of a low-frequency signal and the level of a generated gate voltage has a discrete value.

However, high time resolution may be required depending on an application. In such a case, a circuit configured to selectively apply analog control mode and digital control mode using a single circuit may be very useful.

In the present invention, digital PWM (control) mode corresponds to the aforementioned digital control, and analog PWM (control) mode corresponds to the aforementioned analog control.

Figure 3:
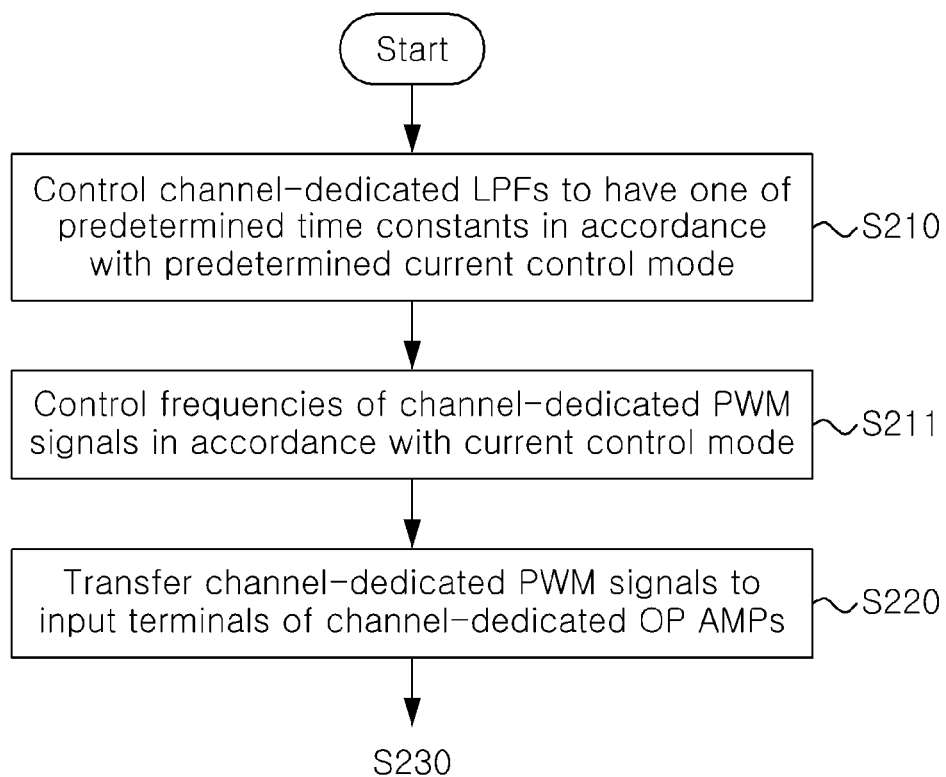
FIG. 3 is a detailed operation flowchart illustrating part of the multi-channel current control method of FIG. 2.

FIG. 3 is a detailed operation flowchart illustrating part of the multi-channel current control method of FIG. 2.

Referring to FIG. 3, in the multi-channel current control method according to an embodiment of the present invention, the frequencies of PWM signals input to the input terminal of the LPFs 121 to 123 are controlled in accordance with current control mode at step S211. The current control mode may be one of digital PWM mode and analog PWM mode. As described above, in digital PWM mode, the frequency of a PWM signal is relatively low because a driving transistor is turned on/off. In contrast, in analog PWM mode, a driving transistor is not turned on/off, but a gate voltage converges to a specific constant voltage depending on the balance between the charging and discharging of a gate node. Accordingly, the frequency of the PWM signal in analog PWM mode is higher than the frequency of the PWM signal in digital PWM mode. Since steps S210 and S220 of FIG. 3 are the same as steps S210 and S220 of FIG. 2, redundant descriptions thereof are omitted.

Figure 4:
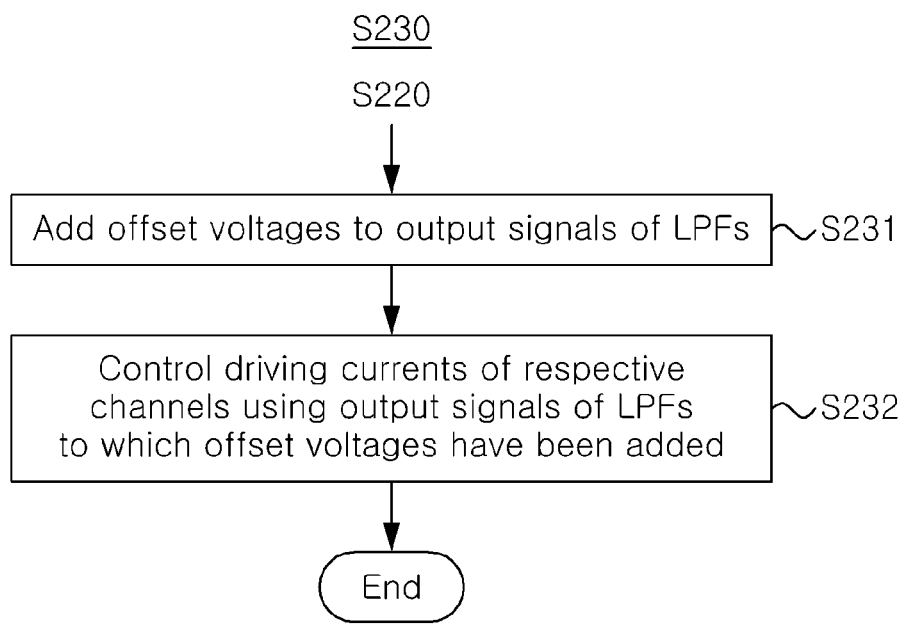
FIG. 4 is a detailed operation flowchart illustrating step S230 in the multi-channel current control method of FIG. 2.

FIG. 4 is a detailed operation flowchart illustrating step S230 in the multi-channel current control method of FIG. 2.

Referring to FIG. 4, in the multi-channel current control method according to an embodiment of the present invention, the channel-dedicated offset generation circuits 115 to 117 add offset voltages to the output signals of the channel-dedicated LPFs 121 to 123 at step S231. In the multi-channel current control method, the channel-dedicated OP AMPs 103 to 105 may control the driving currents of the respective channels using the output signals of the LPFs 121 to 123 to which the offset voltages have been added at step S232. In this case, in the multi-channel current control method, the driving currents of the channels may be controlled using the duty cycles of the PWM signals and the offset voltages in a combination.

If the multi-channel current control apparatus according to an embodiment of the present invention includes a plurality of channels and uses digital control mode for current control, the LPFs 121 to 123 may be set to have time constants smaller than those in analog control mode, and the driving currents of the respective channels may be controlled to be the same by controlling the duty cycles of PWM signals and offset voltages of the respective channels using the offset circuits. Accordingly, heat dissipation by the transistors can be minimized because a voltage applied between drain and source of each transistor is controlled to be minimized.

When current control mode is analog control mode, the LPFs 121 to 123 may be set to have a larger time constant than those in digital control mode, and the driving currents of respective channels may be controlled using output voltages smoothed by high-frequency PWM signals via the LPFs 121 to 123 and offset voltages. High-resolution control can be achieved with a small chip size because the offset voltage can be designed such that only a part of voltage ranges are needed instead of all analog voltage ranges corresponding to current values for the analog control of all channels.

Figure 8:
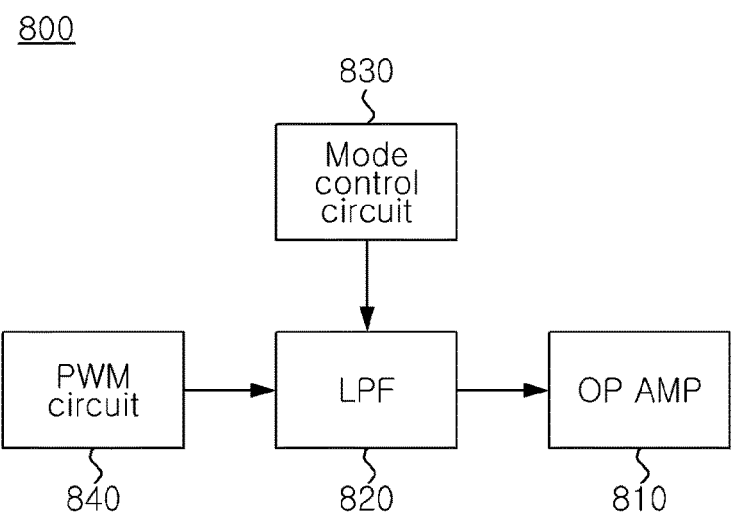
FIG. 8 is a block diagram illustrating a multi-channel current control apparatus according to an embodiment of the present invention.

FIG. 8 is a block diagram illustrating a multi-channel current control apparatus 800 according to an embodiment of the present invention.

The multi-channel current control apparatus 800 includes a channel-dedicated OP AMP 810, a channel-dedicated LPF 820 connected to the input terminal of the channel-dedicated OP AMP 810, a mode control circuit 830 connected to the input terminal of the channel-dedicated OP AMP 810 and configured to control the channel-dedicated LPF 820 to have one of predetermined time constants in accordance with predetermined current control mode, and a PWM circuit 840 configured to generate a channel-dedicated PWM signal and transfer the channel-dedicated PWM signal to the input terminal of the channel-dedicated OP AMP 810 via the channel-dedicated LPF 820. In this case, the channel-dedicated OP AMP 810 controls a corresponding one of the channel-dedicated load currents 112 to 114 using the output voltage thereof.

The predetermined current control mode may be one of digital PWM mode and analog PWM mode. The LPF 820 may have at least two time constants corresponding to both of digital PWM mode and analog PWM mode. The mode control unit 830 may selectively apply digital PWM mode and analog PWM mode using a single circuit based on selected time constant set for the LPF 820.

Figure 9:
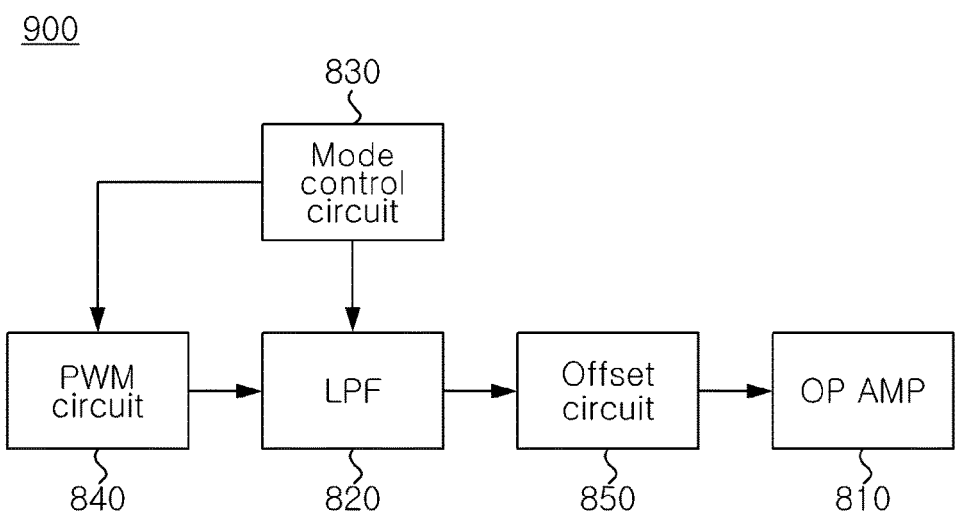
FIG. 9 is a block diagram illustrating a multi-channel current control apparatus according to another embodiment of the present invention.

FIG. 9 is a block diagram illustrating a multi-channel current control apparatus 900 according to another embodiment of the present invention.

The mode control circuit 830 of FIG. 9 may set the time constant of an LPF 820 in accordance with current control mode (i.e., digital PWM control mode or analog PWM control mode), and may control the frequency of a PWM signal input to the input stage of the LPF 820 by controlling a PWM circuit 840. Furthermore, FIG. 9 illustrates an offset circuit 850 configured to add an offset voltage to the output signal of the LPF 820.

Since the OP AMP 810, LPF 820 and PWM circuit 840 of FIG. 9 are the same as the OP AMP 810, LPF 820 and PWM circuit 840 of FIG. 8, redundant descriptions thereof are omitted.

Referring to FIGS. 8 and 9, the multi-channel current driving apparatuses of FIGS. 8 and 9 can control the driving currents of respective channels using the output signals of the LPFs 121 to 123 whose offset voltages have been controlled via the channel-dedicated offset generation circuits 115 to 117. Depending on examples, the multi-channel current driving apparatuses according to the embodiments of the present invention can control the driving currents of respective channels using the duty cycles of PWM signals and offset voltages as described above.

In accordance with at least some embodiments of the present invention, the multi-channel current driving method and apparatus capable of providing various application fields using a small chip area and achieving high-resolution control can be implemented.

In accordance with an embodiment of the present invention, even when the differences in characteristics between channels are large, the multi-channel regulated current driving apparatus capable of controlling the driving currents of channels to be constant can be implemented, and the difference in driving current between the channels can be reduced at high resolution.

The present invention relates to a technology capable of both digital control and analog control using the LPFs capable of selecting a time constant and the offset circuits. In digital control, the LPFs are set to have a small time constant, and the currents of respective channels can be controlled using the offset circuits. Accordingly, the heat dissipation by the transistors can be minimized because voltage applied to the transistors can be minimized.

Furthermore, in analog control, the LPFs are set to have a large time constant, and offset voltages may designed such that only some regions corresponding to corresponding current values are output using PWM signals. Accordingly, high-resolution control can be achieved using a small chip size.

The multi-channel current control method according to at least one embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

As described above, in the present invention, while the present invention has been described in conjunction with specific details, such as specific elements, and limited embodiments and diagrams above, these are provided merely to help an overall understanding of the present invention. The present invention is not limited to these embodiments, and various modifications and variations can be made based on the foregoing description by those having ordinary knowledge in the art to which the present invention pertains.

Accordingly, the technical spirit of the present invention should not be determined based on only the described embodiments, and the following claims, all equivalents to the claims and equivalent modifications should be construed as falling within the scope of the spirit of the present invention.

What is claimed is:

1. A multi-channel current control method comprising:
controlling a low pass filter provided for a channel to have one of predetermined time constants in accordance with predetermined current control mode, wherein the low pass filter is connected to an input terminal of an operational amplifier provided for the channel;
transferring a pulse width modulation signal provided for the channel to the input terminal of the operational amplifier via the low pass filter;
controlling a channel load current using an output voltage of the operational amplifier; and
controlling a frequency of the pulse width modulation signal in accordance with the current control mode,
wherein the controlling the channel load current comprises:
adding an offset voltage to an output signal of the low pass filter; and
controlling a driving current of the channel using the output signal of the low pass filter to which the offset voltage has been added.

2. The multi-channel current control method of claim 1, wherein the controlling the driving current of the channel comprises controlling the driving current of the channel using a duty cycle of the pulse width modulation signal and the offset voltage.

3. The multi-channel current control method of claim 1, wherein the controlling the driving current of the channel comprises, if the channel comprises a plurality of channels and the current control mode is digital control mode, controlling driving currents of the plurality of channels to be same current value one another by controlling duty cycles of pulse width modulation signals and offset voltages for the respective channels.

4. The multi-channel current control method of claim 1, wherein the controlling the driving current of the channel comprises, if the current control mode is analog control mode, controlling the driving current of the channel by controlling a smoothed output voltage of the low pass filter and the offset voltage.

5. A non-transitory computer-readable storage medium having stored therein computer program instructions, which when executed by a processor, causes the processor to:
control a low pass filter provided for a channel to have one of predetermined time constants in accordance with predetermined current control mode, wherein the low pass filter is connected to an input terminal of an operational amplifier provided for the channel;
transfer a pulse width modulation signal provided for the channel to the input terminal of the operational amplifier via the low pass filter;
control a channel load current using an output voltage of the operational amplifier; and
control a frequency of the pulse width modulation signal in accordance with the current control mode,
wherein the channel load current is further controlled by:
adding an offset voltage to an output signal of the low pass filter; and
controlling a driving current of the channel using the output signal of the low pass filter to which the offset voltage has been added.

6. A multi-channel current control circuit, comprising:
an operational amplifier provided for a channel;
a low pass filter provided for the channel connected to an input terminal of the operational amplifier;
a mode control circuit configured to control the low pass filter to have one of predetermined time constants in accordance with predetermined current control mode; and
a pulse width modulation circuit configured to:
generate a pulse width modulation signal provided for the channel; and
transfer the pulse width modulation signal to the input terminal of the operational amplifier via the low pass filter;

wherein the operational amplifier controls a load current of the channel using an output voltage of the operational amplifier.

7. The multi-channel current control circuit of claim 6, further comprising an offset circuit configured to add an offset voltage to an output signal of the low pass filter;
   wherein the mode control circuit controls a frequency of the pulse width modulation signal to be input to an input terminal of the low pass filter in accordance with the current control mode; and
   wherein the operational amplifier controls a driving current of the channel using the output signal of the low pass filter to which the offset voltage has been added.

8. The multi-channel current control circuit of claim 7, wherein the driving current of the channel is controlled based on a duty cycle of the pulse width modulation signal under a control of the pulse width modulation circuit and the offset voltage under a control of the offset circuit.

9. The multi-channel current control circuit of claim 7, wherein, if the channel comprises a plurality of channels and the current control mode is digital control mode, driving currents of the plurality of channels are controlled to be same current value one another by controlling duty cycles of pulse width modulation signals and offset voltages for the respective channels.

10. The multi-channel current control circuit of claim 7, wherein if the current control mode is analog control mode, the driving current of the channel is controlled by controlling a smoothed output voltage of the low pass filter and the offset voltage by means of the PWM circuit and the offset circuit.

* * * * *